US010766326B2

(12) United States Patent
Hata et al.

(10) Patent No.: US 10,766,326 B2
(45) Date of Patent: Sep. 8, 2020

(54) LOWER ARM SUPPORTING BRACKET AND LOWER ARM SUPPORTING MECHANISM INCLUDING THE SAME

(71) Applicant: TOYOTA JIDOSHA KABUSHIKI KAISHA, Toyota-shi, Aichi-ken (JP)

(72) Inventors: Masatoshi Hata, Toyota (JP); Takero Kato, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 91 days.

(21) Appl. No.: 16/121,298

(22) Filed: Sep. 4, 2018

(65) Prior Publication Data
US 2019/0100065 A1   Apr. 4, 2019

(30) Foreign Application Priority Data
Sep. 29, 2017   (JP) .................. 2017-189940

(51) Int. Cl.
*B60G 7/00* (2006.01)
*B60G 3/20* (2006.01)
*B62D 21/15* (2006.01)

(52) U.S. Cl.
CPC ............. *B60G 7/008* (2013.01); *B60G 3/20* (2013.01); *B60G 7/001* (2013.01); *B62D 21/15* (2013.01); *B60G 2200/14* (2013.01); *B60G 2204/143* (2013.01); *B60G 2204/4302* (2013.01); *B60G 2206/016* (2013.01)

(58) Field of Classification Search
CPC .......... B60G 7/008; B60G 3/20; B60G 7/001; B60G 2200/14; B60G 2206/016; B60G 2204/4302; B60G 2204/143; B62D 21/15
See application file for complete search history.

(56) References Cited

U.S. PATENT DOCUMENTS

| 5,374,075 | A | * | 12/1994 | Lee | ............ | B60G 3/06 280/86.754 |
| 5,607,177 | A | * | 3/1997 | Kato | ............ | B60G 3/06 188/377 |
| 5,775,719 | A | * | 7/1998 | Holden | ............ | B60G 7/02 280/86.75 |
| 2002/0063005 | A1 | * | 5/2002 | Klais | ............ | B60G 7/02 180/167 |
| 2002/0180171 | A1 | * | 12/2002 | Hasebe | ............ | B60G 7/02 280/124.134 |

(Continued)

FOREIGN PATENT DOCUMENTS

JP       2016-037241 A       3/2016

*Primary Examiner* — Frank B Vanaman
(74) *Attorney, Agent, or Firm* — Oliff PLC (57) ABSTRACT

A first bracket supporting a first lower arm includes a front wall part and a rear wall part that face each other in a vehicle longitudinal direction. Respective insertion holes, through which a supporting bolt pivotably supporting the first lower arm is inserted, are formed in the front wall part and the rear wall part so as to face each other. Furthermore, the front wall part includes a fracture starting point formed in a region on an outside, in a vehicle width direction, from a center position of the insertion hole. Consequently, it is possible to separate a front wheel from a vehicle body at the time of collision without providing any fragile part such as a cutout in the lower arm.

2 Claims, 13 Drawing Sheets

(56) References Cited

U.S. PATENT DOCUMENTS

| | | | |
|---|---|---|---|
| 2003/0090099 A1* | 5/2003 | Miyasaka | B60G 7/02 280/784 |
| 2008/0036167 A1* | 2/2008 | Svartz | B60G 7/006 280/124.116 |
| 2013/0042464 A1* | 2/2013 | Orcutt | B23P 6/00 29/525.11 |
| 2015/0329143 A1* | 11/2015 | Fujita | B62D 21/11 280/784 |
| 2017/0305228 A1* | 10/2017 | Aitoh | B21D 53/88 |

* cited by examiner

LOWER ARM SUPPORTING BRACKET AND LOWER ARM SUPPORTING MECHANISM INCLUDING THE SAME

PRIORITY INFORMATION

This application claims priority to Japanese Patent Application No. 2017-189940, filed on Sep. 29, 2017, which is incorporated herein by reference in its entirety.

TECHNICAL FIELD

The present disclosure relates to a bracket that supports a lower arm of a front suspension mechanism, and a lower arm supporting mechanism including the same.

PRIOR ART

As a mode of front collision of a vehicle, fine lap (small overlap) collision is known. In this collision mode, for example, a vehicle collides with an obstacle (barrier) having a width of about ¼ of the vehicular width from a vehicle left end. At this time, among framework members of the vehicle, a front bumper reinforce (hereinafter appropriately written as a front bumper R/F) extending over the whole width of the vehicle, and a front suspension member (hereinafter appropriately written as a front suspension member) mainly receive collision load.

Figure 13:
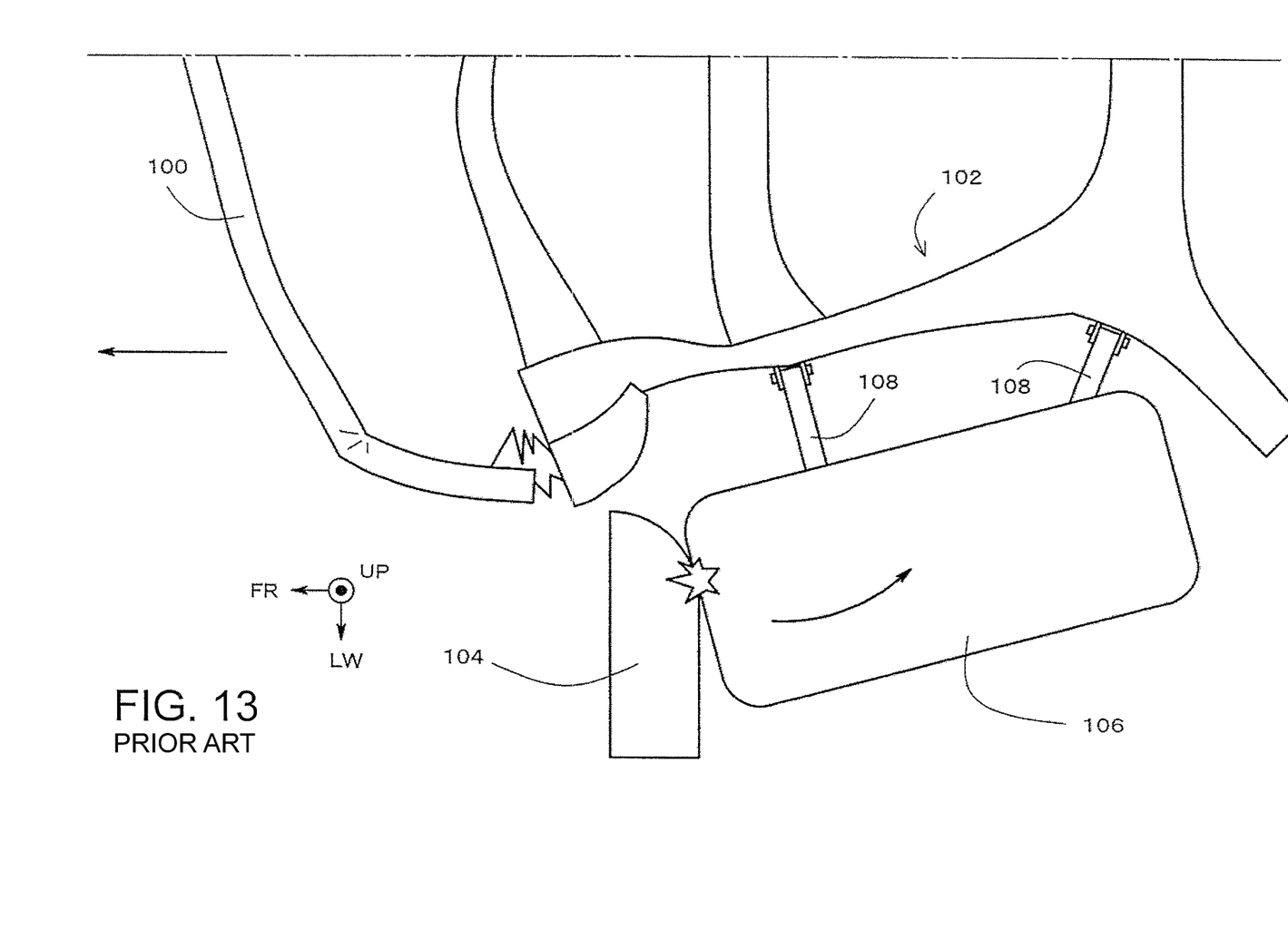
FIG. 13 is a plan view for explaining a conventional small overlap collision.

As illustrated in FIG. 13, in a process of receiving collision load, there is a risk that a front bumper R/F 100 and a front end of a front suspension member 102 will be bent and deformed, and a barrier 104 slip before these framework members sufficiently absorb the collision load. After this slipping, a front wheel 106 collides with the barrier 104. At this time, as illustrated in the drawing, the front wheel 106 opens outward with lower arms 108 of the front suspension mechanism as shafts, namely, is brought into a so-called toe-out condition. When the barrier 104 further advances to the rear side of the vehicle, there is a risk that the front wheel 106 will further turn in the arrow direction, and press, for example, a toe board (not illustrated) that is behind the front wheel, and that is an occupant's footrest plate material.

For example, in JP 2016-37241 A, a structure in which a front wheel is separated from a vehicle body at the time of small overlap collision is provided. More specifically, in JP 2016-37241 A, a cutout is provided in a lower arm that connects the front wheel and the vehicle body, so that the lower arm is easily fractured at the time of collision.

SUMMARY OF THE INVENTION

The lower arm may sometimes be traded singly as a so-called tuning part. In such a case, although the strength during normal traveling is sufficiently secured, it cannot be said that the lower arm provided with the cutout has appeal for a user who desires rigidity improvement, for example, and there is still room for improvement in appearance. Therefore, it is an advantage of the present disclosure to provide a lower arm supporting bracket enabling separation of a front wheel from a vehicle body at the time of collision without providing any fragile part such as a cutout in a lower arm, and a lower arm supporting mechanism including the same.

Means for Solving the Problems

The present disclosure relates to a lower arm supporting bracket that is fixed to a front suspension member, and supports a lower arm of a front suspension mechanism. The bracket includes a front wall part and a rear wall part that face each other in a vehicle longitudinal direction. Respective insertion holes through which a supporting shaft member pivotably supporting the lower arm is inserted are formed in the front wall part and the rear wall part so as to face each other. Furthermore, the front wall part includes a fracture starting point formed in a region on an outside in a vehicle width direction from a center position of the insertion hole.

At the time of small overlap collision, load that acts rearward and outward (toe-out) is input to a front wheel. At this time, load outward in the vehicle width direction is generated in the supporting shaft member supporting the lower arm connected to the front wheel, the load acting with a supporting point by the rear wall part of the bracket as a fulcrum and with the supporting point by the front wall part as a point of load. The fracture starting point is provided in the region on the outside in the vehicle width direction from the center position of the insertion hole in the front wall part and which receives the load at the point of load, so fracture of the front wall part to break open the insertion hole outward in vehicular width direction is facilitated. Consequently, it is possible to sweep the supporting shaft member and the lower arm outside the bracket.

In the above disclosure, the fracture starting point may include a cutout formed in a lower end of the front wall part on the outside in the vehicle width direction from the center position of the insertion hole of the front wall part.

The cutout is formed, so that it is possible to intentionally make a portion that is the shortest distance from the insertion hole to an edge of the front wall part, that is, the fracture starting point (relatively fragile part), and fracture as intended is enabled.

In the above disclosure, a through hole may be formed on the outside in the vehicle width direction of the front wall part from the center position of the insertion hole above the insertion hole.

The through hole is provided, so that fracture from the cutout at the lower end of the front wall part to the through hole above the insertion hole occurs easily. Consequently, the outside in the vehicle width direction of the insertion hole is completely broken open, and sweep-out of the supporting shaft member is reliably performed.

The present disclosure relates to a lower arm supporting mechanism including the lower arm supporting bracket described above. A reinforcing member that projects outward in the vehicle width direction from the front suspension member, and is joined to an upper part of the rear wall part is provided in the upper part of the rear wall part of the lower arm supporting bracket. Projection of the reinforcing member to the upper part of the rear wall part is terminated on an inside in the vehicle width direction with respect to the insertion hole of the rear wall part in plan view.

The reinforcement of the bracket by the reinforcing member is terminated on the inside in the vehicular width direction with respect to (before) the insertion hole of the rear wall part in plan view, so that bending deformation of a portion on the outside in the vehicular width direction from the insertion hole of the rear wall part as a fulcrum at the time of small overlap collision is facilitated. Consequently, the supporting shaft member pivot easily.

Advantage of the Invention

According to the present disclosure, it is possible to separate a front wheel from a vehicle body at the time of collision without providing any fragile part such as a cutout in a lower arm.

BRIEF DESCRIPTION OF THE DRAWINGS

The present invention will be further described with reference to the accompanying drawings, wherein like reference numerals refer to like parts in the several views, and wherein.

DETAIL DESCRIPTION OF THE INVENTION

Figure 1:
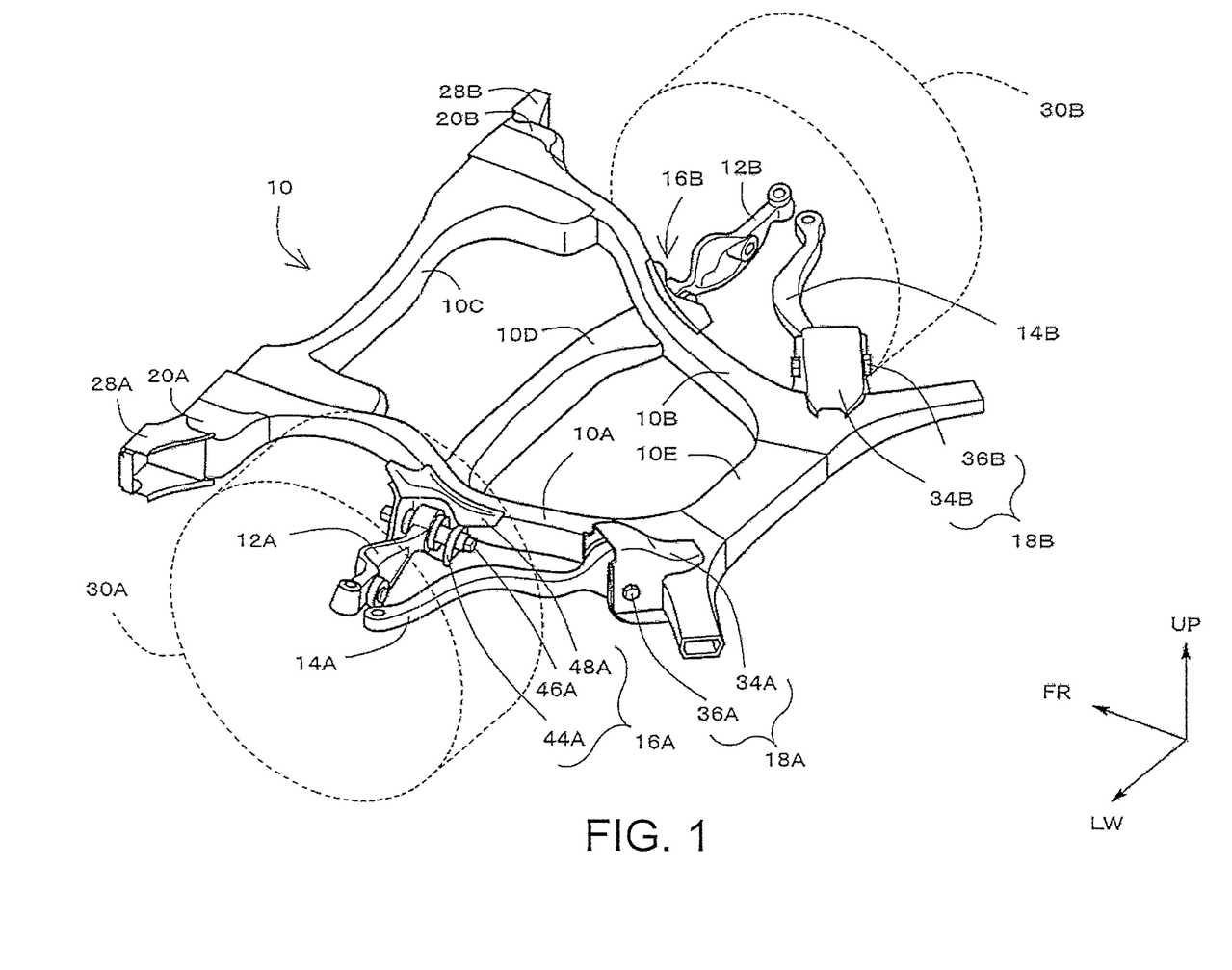
FIG. 1 is a perspective view illustrating a vehicle front structure, including a bracket according to the embodiment, and a lower arm supporting mechanism.
Figure 2:
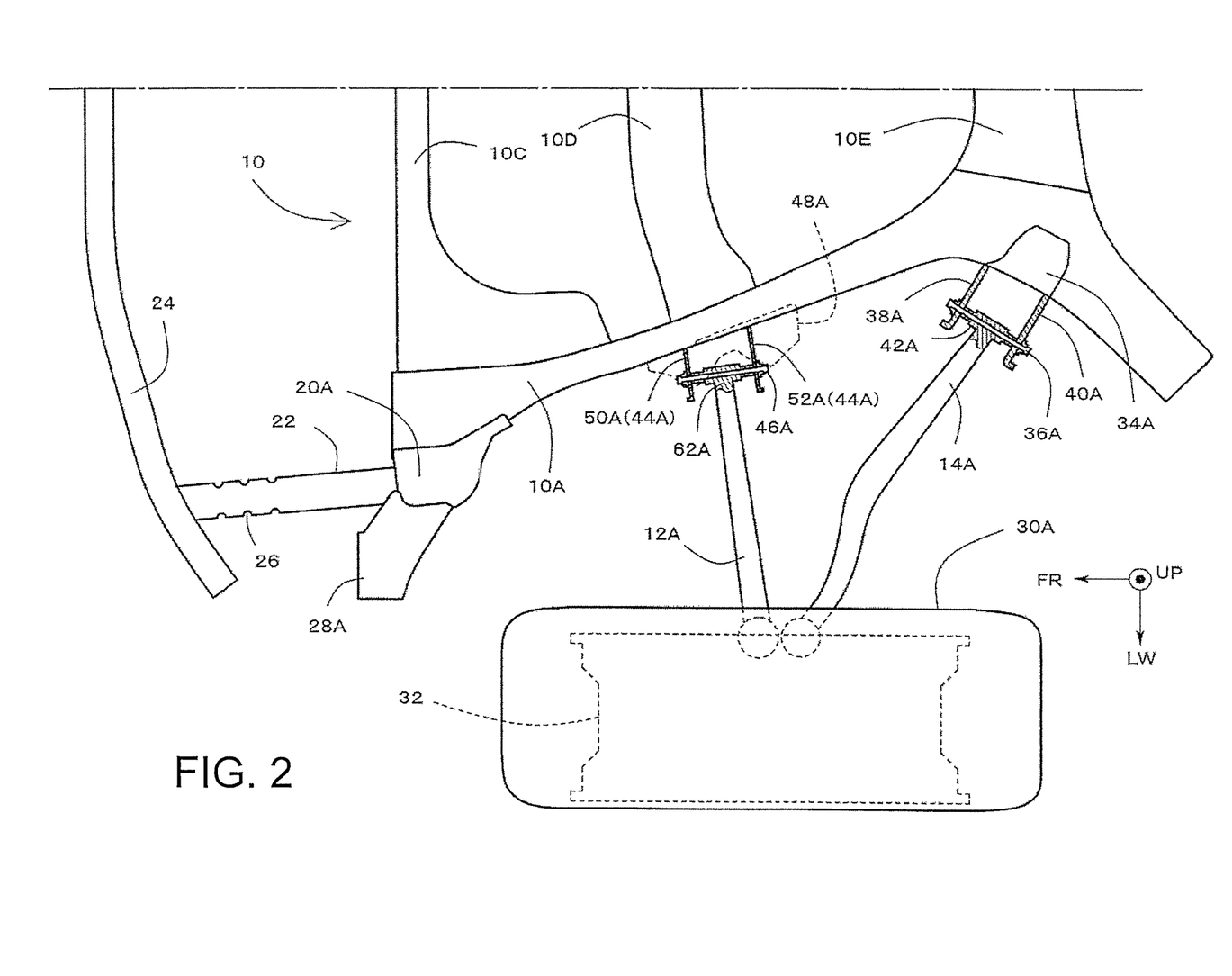
FIG. 2 is a plan view illustrating the vehicle front structure, including the bracket according to the embodiment, and the lower arm supporting mechanism.

FIG. 1 is a perspective view of a vehicle front structure, including a lower arm supporting bracket according to the embodiment, and a lower arm supporting mechanism including the same. Additionally, FIG. 2 is a plan view illustrating the above structure with a front bumper R/F 24 mounted thereto. FIG. 2 illustrates only a left side because the vehicle structure is symmetrical.

In FIG. 1 to FIG. 12, the vehicle longitudinal direction is illustrated by an axis denoted by symbol FR, the vehicular width direction (vehicle width direction) is illustrated by an axis denoted by symbol LW, the vertical direction is illustrated by an axis denoted by symbol UP. Symbol FR is an abbreviation of Front, and in the longitudinal direction axis FR, the vehicle front side is defined as the positive direction. Symbol LW is an abbreviation of Left Width, and in the width direction axis LW, the left direction is defined as the positive direction. Additionally, in the height axis UP, the upward direction is defined as the positive direction.

As illustrated in FIG. 1, these FR axis, LW axis, and UP axis are orthogonal with each other. Hereinafter, when the lower arm supporting bracket according to the embodiment and the lower arm supporting mechanism are described, description is appropriately made with these three axes as references. For example, a "front end" indicates an end on the positive direction side of the FR axis of an arbitrary member, and a "rear end" indicates an end on the negative direction side of the FR axis of the arbitrary member. The "width inside" relatively indicates the inside in the width direction of a vehicle along the LW axis, and the "width outside" relatively indicates the outside in the width direction of the vehicle along the LW axis. Furthermore, the "upper side" relatively indicates the positive direction side of the UP axis, and the "lower side" relatively indicates the negative direction side of the UP axis.

<Overall Structure>

As illustrated in FIG. 1, the vehicle front structure includes a front suspension member 10, first lower arms 12A, 12B, second lower arms 14A, 14B, first lower arm supporting mechanisms 16A, 16B, and second lower arm supporting mechanisms 18A, 18B.

The front suspension member 10 is a framework member that supports a front suspension mechanism. In FIG. 1 to FIG. 12, illustration of struts and upper arms that are each a part of the front suspension mechanism is omitted.

The front suspension member 10 includes, for example, side rails 10A, 10B that extend in the substantially vehicle longitudinal direction, and a front cross 10C, a center cross 10D, and a rear cross 10E that are laid between the side rails 10A, 10B, and extend in the vehicular width direction. These members each have, for example, a closed cross section structure, and are each formed from an upper member and a lower member overlapped with each other. At least a part of these members is composed of, for example, a high tensile steel plate.

The front cross 10C, the center cross 10D, and the rear cross 10E are successively disposed from the vehicle front side to the rear side. More specifically, the front cross 10C is provided in front ends of the side rails 10A, 10B, and the rear cross 10E is provided in rear ends, and the center cross 10D is provided at intermediate positions of the front and rear ends. As described below, first lower arm supporting mechanisms 16A, 16B are provided in both ends in the vehicular width direction of the center cross 10D, and the second lower arm supporting mechanisms 18A, 18B are provided in both ends in the vehicular width direction of the rear cross 10E.

The side rails 10A, 10B extend in the substantially vehicle longitudinal direction. As illustrated in the perspective view of FIG. 1, rear parts are curved downward. As illustrated in the plan view of FIG. 2, the side rails 10A, 10B are configured so as to open outward in the vehicular width direction from the rear side to the front side.

Crash box brackets 20A, 20B (hereinafter appropriately written as C/B brackets) that project outward in the vehicular width direction are provided on the outsides in the vehicular width direction of the front ends of the side rails 10A, 10B. A crash box 22 (refer to FIG. 2) is connected to respective front ends of the C/B brackets 20A, 20B.

The crash box 22 extends in the vehicle longitudinal direction, and connects the front suspension member 10 and the front bumper R/F 24 to each other. The crash box 22 includes a plurality of crash beads 26 formed thereon. At the time of front collision, the crash box 22 is collapsed and deformed with the crash beads 26 as starting points.

Extensions 28A, 28B (extension members) are provided in ends in the vehicular width direction at a front end of the front suspension member 10. More specifically, the extensions 28A, 28B are provided so as to further project outward in the vehicle width direction from both ends of the C/B brackets 20A, 20B provided in both ends in the vehicular width direction at the front end of the front suspension member 10.

The first lower arms 12A, 12B and the second lower arms 14A, 14B are constructional elements of the front suspension mechanism, and are suspension members for placing a vehicle body on front wheels 30A, 30B.

The second lower arms 14A, 14B are provided on the vehicle rear side with respect to the first lower arms 12A, 12B. More specifically, the second lower arm supporting mechanisms 18A, 18B are mounted on both ends in the vehicular width direction of the rear cross 10E at rear ends of the side rails 10A, 10B. First ends of the second lower arms 14A, 14B are pivotably supported by these second lower arm supporting mechanisms 18A, 18B. The second lower arms 14A, 14B extend outward in the vehicular width direction on the vehicle front side from these first ends, and second ends of the second lower arms 14A, 14B are connected to wheels 32 (refer to FIG. 2) of the front wheels 30A, 30B.

The second lower arm supporting mechanisms 18A, 18B include second brackets 34A, 34B mounted on the side rails 10A, 10B, and support bolts 36A, 36B supported by the second brackets 34A, 34B, respectively. The second brackets 34A, 34B are joined to the side rails 10A, 10B, respectively, by arc welding or the like, for example. As illustrated in FIG. 2, a front wall part 38A (, 38B) and a rear wall part 40A (, 40B) that face each other are provided in the second bracket 34A (, 34B), and both the wall parts are provided with respective insertion holes. The support bolt 36A (, 36B) is inserted into the facing insertion holes, and a rod joint 42A (, 42B) provided in the first end of the second lower arm 14A (, 14B). Consequently, the second lower arm 14A (, 14B) can pivot in the vehicle vertical direction with the support bolt 36A (, 36B) as a fulcrum.

The first lower arms 12A, 12B are provided on the vehicle front side with respect to the second lower arms 14A, 14B, respectively. More specifically, the first lower arm supporting mechanisms 16A, 16B are mounted on both ends in the vehicular width direction of the center cross 10D at central parts in the vehicle longitudinal direction of the side rails 10A, 10B, respectively. First ends of the first lower arms 12A, 12B are pivotably supported by the first lower arm supporting mechanisms 16A, 16B, respectively. The first lower arms 12A, 12B extend outward in the vehicular width direction on the vehicle rear side from these first ends, and second ends of the first lower arms 12A, 12B are connected to the wheels 32 (refer to FIG. 2) of the front wheels 30A, 30B.

Figure 3:
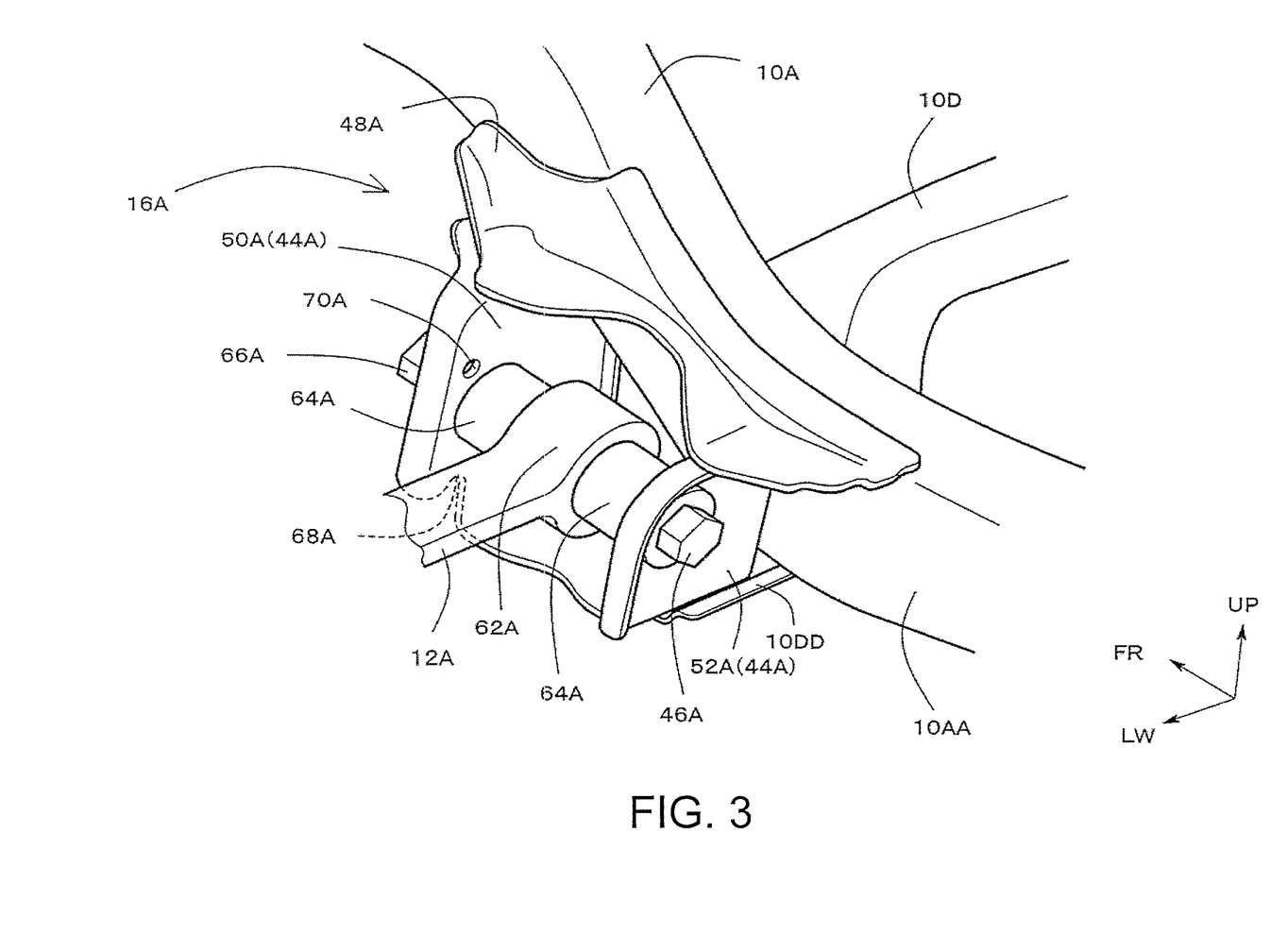
FIG. 3 is an enlarged perspective view of FIG. 1.

FIG. 3 is an enlarged perspective view of the periphery of the first lower arm supporting mechanism 16A. Because the vehicle structure is symmetrical, the first lower arm supporting mechanism 16B and the peripheral thereof have similar structures. More specifically, when the final letter "A" of the symbol is replaced with "B", the structures of the first lower arm supporting mechanism 16B and the peripheral thereof are described.

Figure 4:
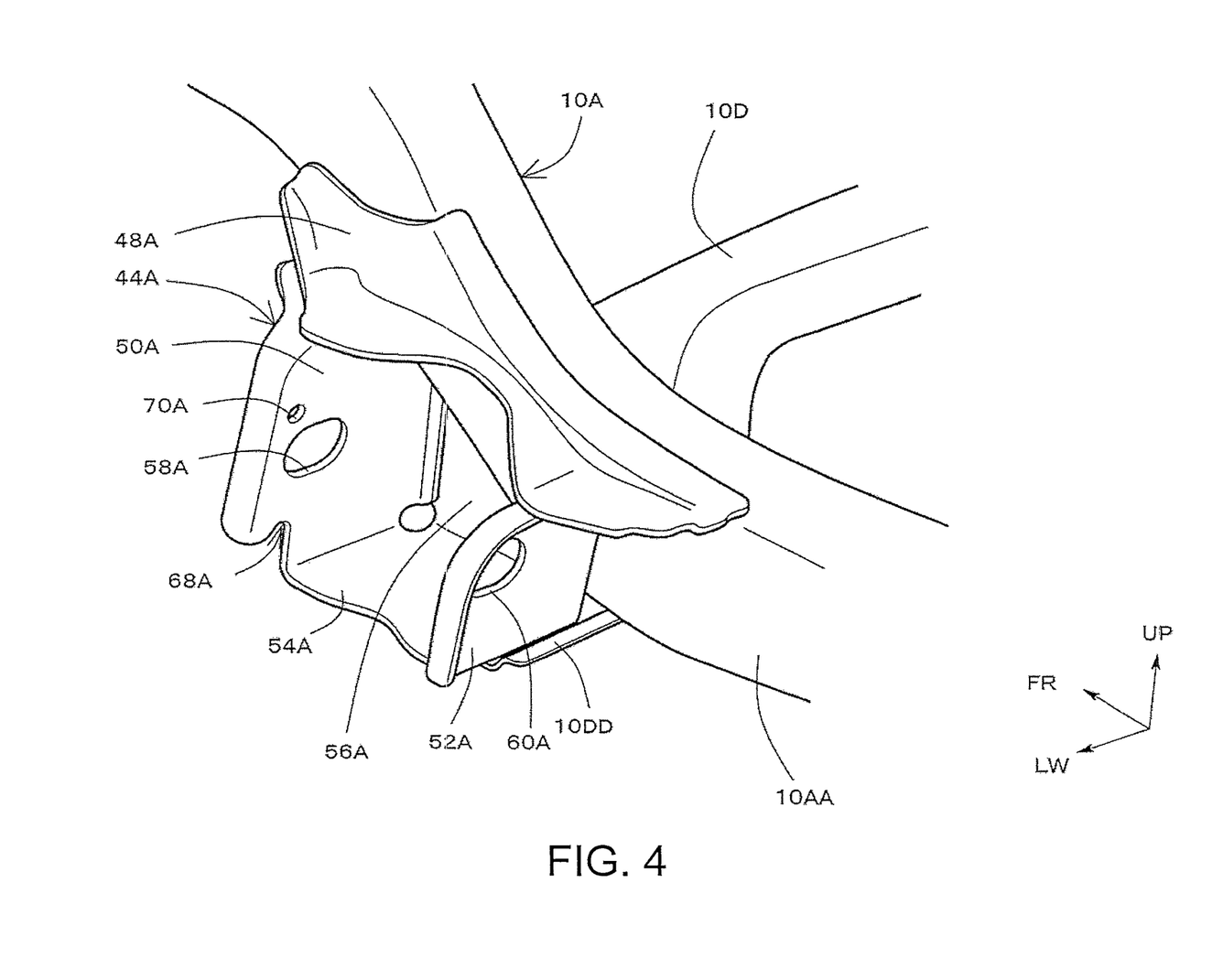
FIG. 4 is a perspective view illustrating an example in which a lower arm and a supporting shaft thereof are removed from FIG. 3.

The first lower arm supporting mechanism 16A includes a first bracket 44A, a support bolt 46A (supporting shaft member), and a reinforcing patch 48A (reinforcing member). FIG. 4 is a perspective view of an example in which the first lower arm 12A, and the support bolt 46A and the peripheral member thereof are removed from FIG. 3, and FIG. 5 is a perspective view of a single body of the first bracket 44A (lower arm supporting bracket) according to the embodiment.

Figure 5:
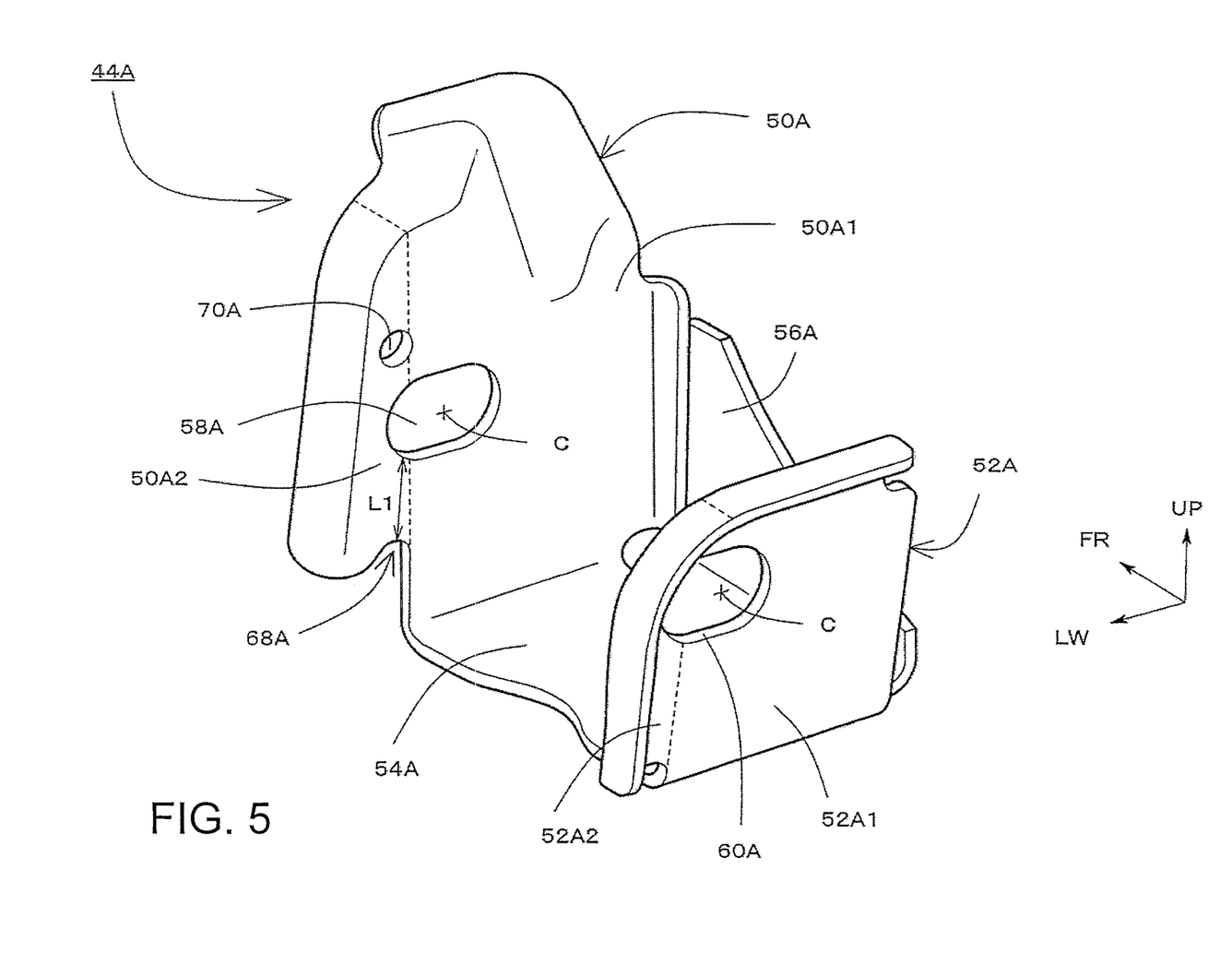
FIG. 5 is a perspective view illustrating a first bracket.

With reference to FIG. 3 to FIG. 5, the first bracket 44A is fixed to the front suspension member 10, and pivotably supports the first lower arm 12A. For example, the first bracket 44A is joined to a side wall 10AA located on the outside in the vehicle width direction of the side rail 10A, and a lower part 10DD of the center cross 10D extending up to the outside in the vehicle width direction across a lower part of the side rail 10A by arc welding or the like.

The first bracket 44A is shaped by, for example, pressing a metal flat plate. The first bracket 44A includes a front wall part 50A, a rear wall part 52A, a bottom wall part 54A, and a side wall part 56A.

The side wall part 56A is a wall member in contact with the side wall 10AA of the side rail 10A. Additionally, the bottom wall part 54A connects the front wall part 50A and the rear wall part 52A to each other.

The front wall part 50A and the rear wall part 52A are provided so as to face each other in the vehicle longitudinal direction. The front wall part 50A includes a base part 50A1 connected to the bottom wall part 54A, and a projecting part 50A2 that projects outward in the vehicle width direction from the base part 50A1, and is not connected to the bottom wall part 54A, as virtually sectioned by a broken line of FIG. 5.

Similarly to the front wall part 50A, the rear wall part 52A also includes a base part 52A1 connected to the bottom wall part 54A, and a projecting part 52A2 that projects outward in the vehicle width direction from the base part 52A1, and is not connected to the bottom wall part 54A, as virtually sectioned by a broken line of FIG. 5.

Furthermore, insertion holes 58A, 60A are provided in the front wall part 50A and the rear wall part 52A respectively so as to face each other. The insertion hole 58A of the front wall part 50A is formed across the base part 50A1 and the projecting part 50A2 of the front wall part 50A. Similarly, the insertion hole 60A of the rear wall part 52A is formed across the base part 52A1 and the projecting part 52A2 of the rear wall part 52A. The respective centers C of the insertion holes 58A, 60A are provided on the base part 50A1, 52A1 sides, respectively.

As illustrated in FIG. 3, the support bolt 46A as a supporting shaft member is inserted into these insertion holes 58A, 60A. For example, the support bolt 46A is inserted between the insertion holes 58A, 60A in a state where a rod joint 62A of the first lower arm 12A, and a collar 64A are coaxially disposed. An end of a shaft part of the support bolt 46A protrudes from the insertion hole 58A toward the vehicle front side, and is fastened with a nut 66A. Consequently, the support bolt 46A is supported by the first bracket 44A, and furthermore, the first lower arm 12A can pivot in the vehicle vertical direction with the support bolt 46A as a fulcrum (pivot axis).

As illustrated in FIG. 4 and FIG. 5, a cutout 68A and a through hole 70A are formed in the front wall part 50A of the first bracket 44A.

The cutout 68A is provided in a lower end of the front wall part 50A on the outside in the vehicle width direction of the front wall part 50A from the center C of the insertion hole 58A. More specifically, with reference to FIG. 5, the cutout 68A is formed in a lower end of the projecting part 50A2 of the front wall part 50A at a boundary (root) with the base part 50A1.

The cutout 68A may have a curved shape. As illustrated in FIG. 5, a distance L1 from the insertion hole 58A to the cutout 68A is the shortest distance from the insertion hole 58A to an edge of the front wall part 50A. In other words, a section from the insertion hole 58A to the cutout 68A, indicated by the distance L1, becomes a fracture starting point (fragile part) in the front wall part 50A. As illustrated in FIG. 5, the cutout 68A is formed in a region on the outside in the vehicle width direction of the front wall part 50A from the center C of the insertion hole 58A, so that the fracture starting point is formed in the region on the outside in the vehicle width direction of the front wall part 50A from the center C of the insertion hole 58A.

The through hole 70A is provided above the cutout 68A in the vertical direction, and is formed on the outside in the vehicle width direction from the center C of the insertion hole 58A above the insertion hole. More specifically, the through hole 70A is formed so as to partially overlap with a boundary (broken line) between the projecting part 50A2 and the base part 50A1 of the front wall part 50A.

For example, the insertion hole 58A, the cutout 68A, and the through hole 70A may be aligned at least partially on a vertical line. Thus, when the front wall part 50A is fractured from the cutout 68A to the through hole 70A, at least a part of the insertion hole 58A is included on the fracture path, and insertion hole 58A is broken open.

As illustrated in FIG. 4, the reinforcing patch 48A is a reinforcing member joined to upper parts of the front wall part 50A and the rear wall part 52A of the first bracket 44A. By this joining, support of the first bracket 44A to the front suspension member 10 is reinforced, and rigidity in the vehicle longitudinal direction of the first bracket 44A is improved.

The reinforcing patch 48A is a substantially flat plate member, and the inside in the vehicle width direction is joined to the side rail 10A by arc welding or the like. Additionally, the reinforcing patch 48A projects outward in the vehicle width direction from the front suspension member 10, and the projecting portion is joined to the upper part of the front wall part 50A and the upper part of the rear wall part 52A of the first bracket 44A by arc welding or the like.

Herein, referring to FIG. 4 and FIG. 11 described below, in a joining region of the reinforcing patch 48A and the rear wall part 52A, projection of the reinforcing patch 48A from the front suspension member 10 (projection outward in the vehicle width direction) is terminated on the inside in the vehicle width direction of the first bracket 44A with respect to the insertion hole 60A of the rear wall part 52A in plan view. In other words, the projecting portion of the reinforcing patch 48A is terminated before the insertion hole 60A of the rear wall part 52A, as viewed from the front suspension member 10. That is, the strength of the outside in the vehicle width direction of the rear wall part 52A with respect to the insertion hole 60A is intentionally made lower than the inside. With such a configuration, as described below, the portion on the outside in the vehicle width direction of the rear wall part 52A with respect to the insertion hole 60A is easily bent and deformed at the time of fracture of the first bracket 44A.

<Behavior at Time of Small Overlap Collision>

Figure 6:
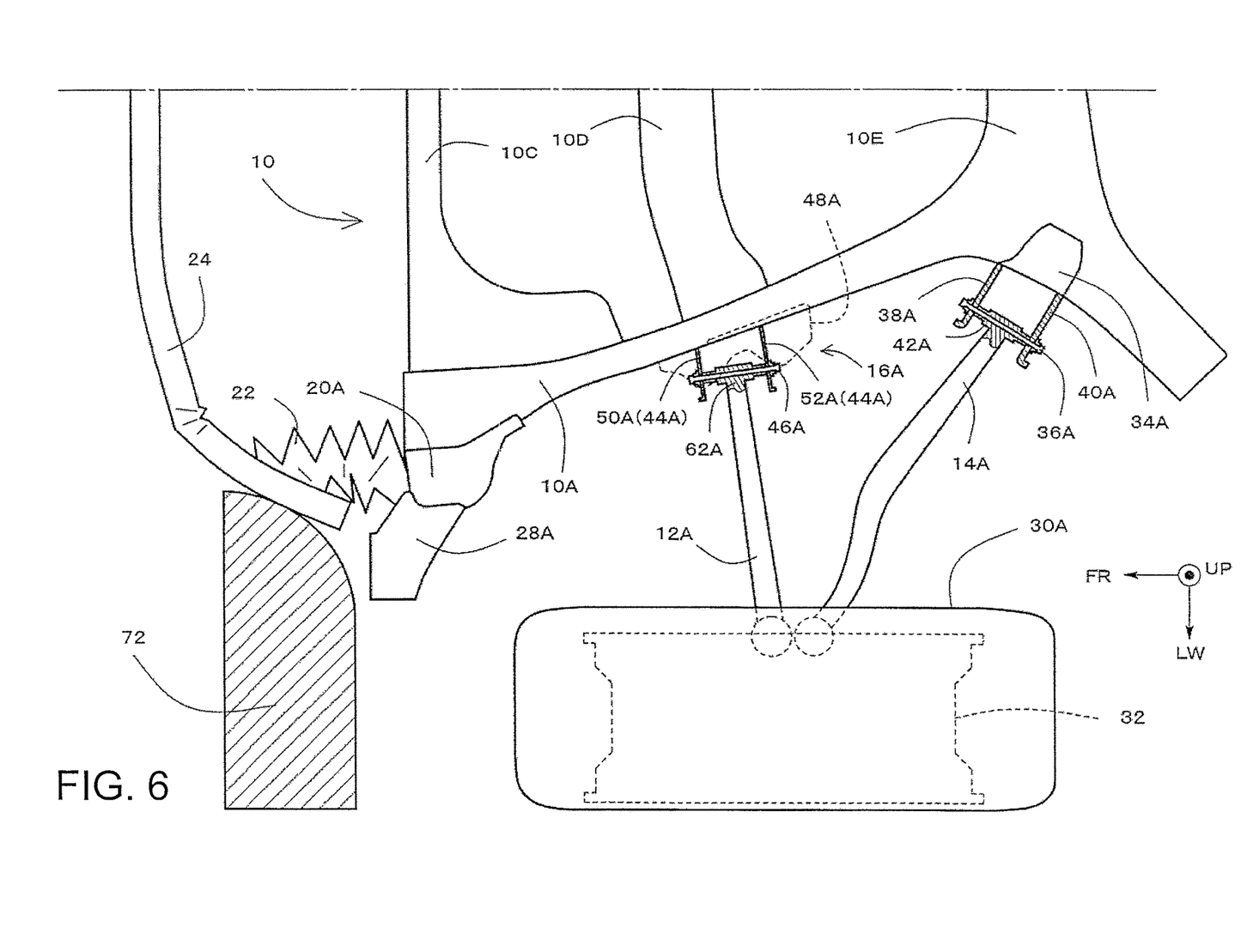
FIG. 6 is a plan view illustrating a state of an initial stage of small overlap collision.
Figure 7:
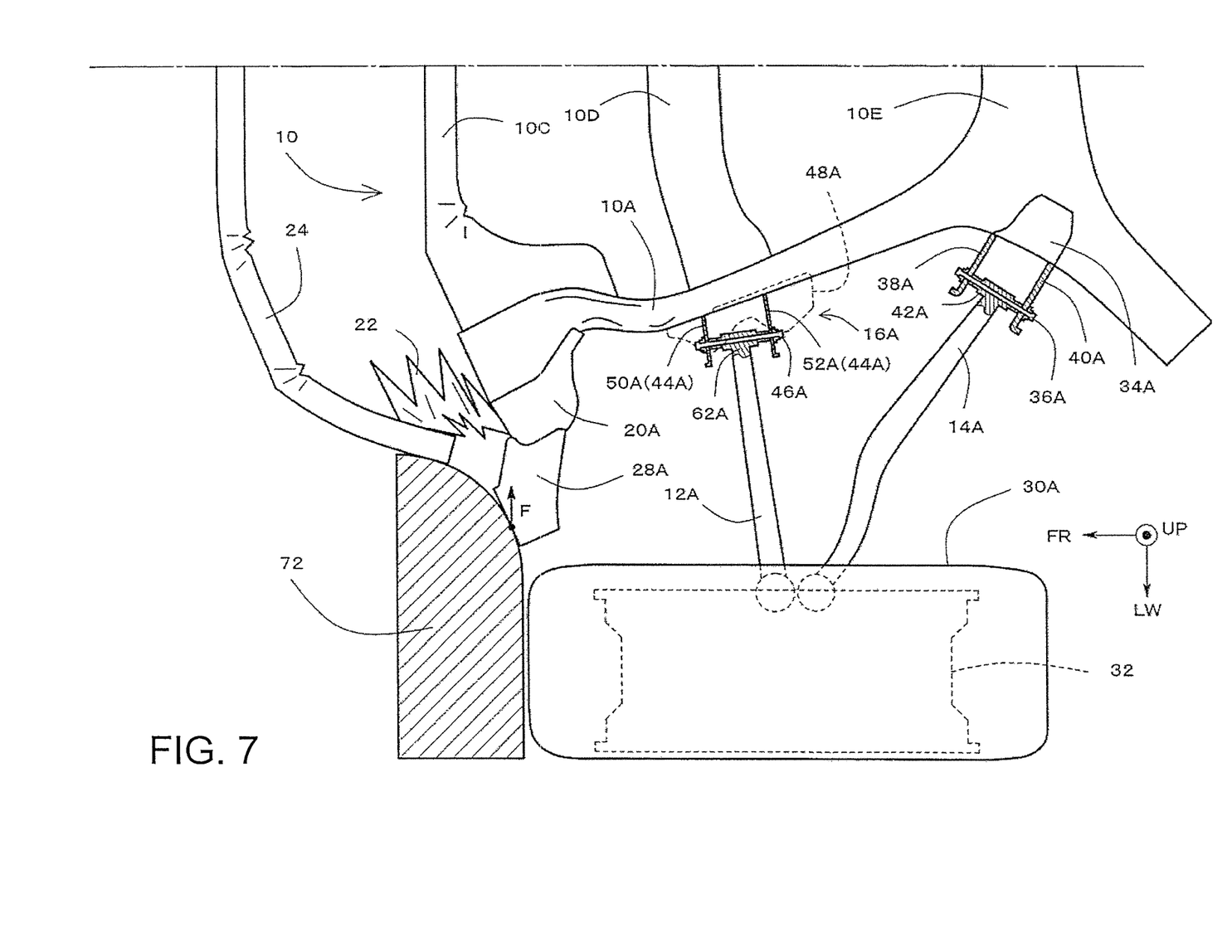
FIG. 7 is a plan view illustrating a state of an intermediate stage of the small overlap collision.
Figure 8:
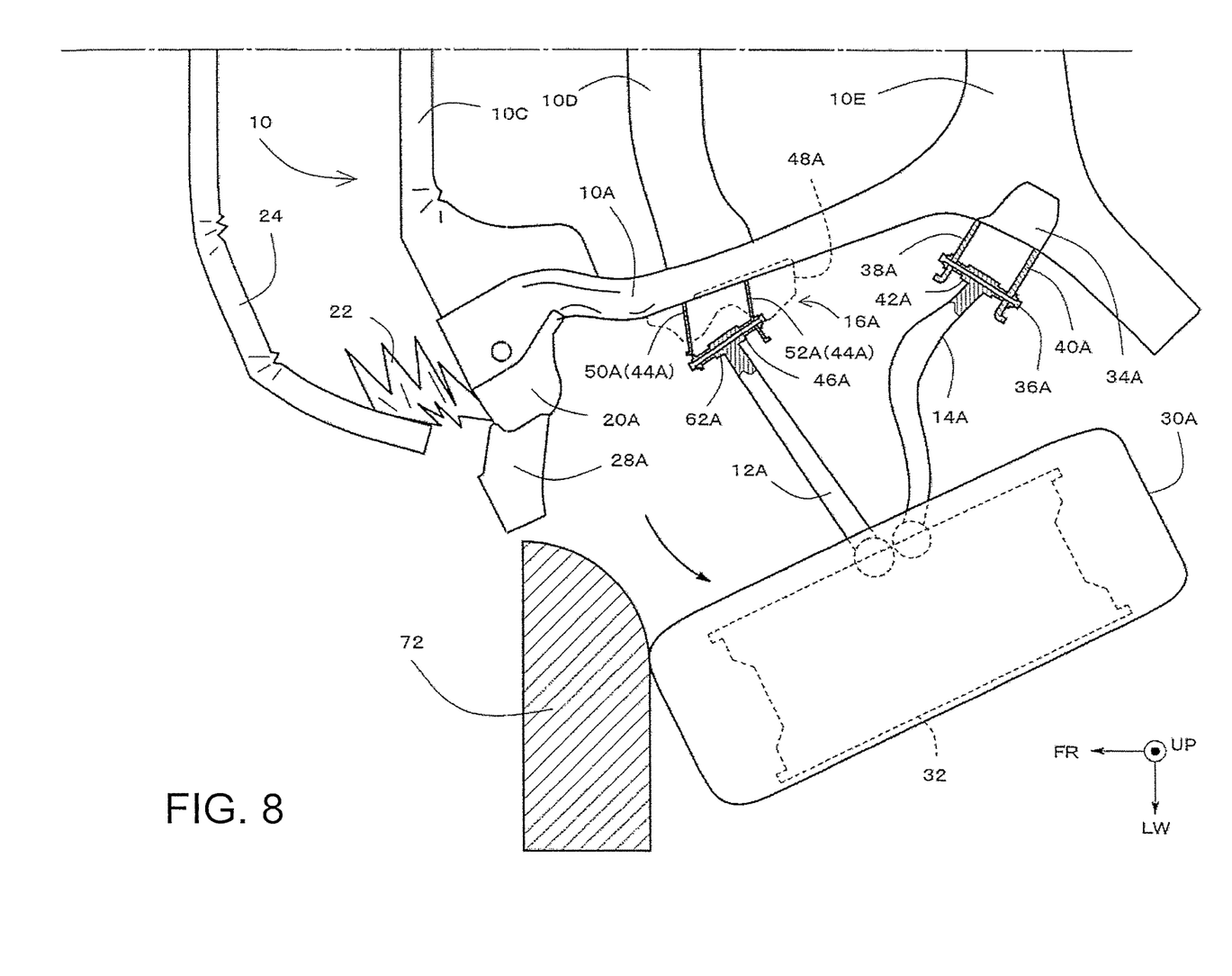
FIG. 8 is a plan view illustrating a state of a later stage of the small overlap collision.

With reference to FIG. 6 to FIG. 11, behavior of the lower arm supporting bracket according to the embodiment, and the lower arm supporting mechanism including the same at the time of small overlap collision will be described. FIG. 6, FIG. 7, and FIG. 8 sequentially illustrate vehicle front structures at an initial stage, an intermediate stage, and a later stage of small overlap collision. FIG. 6 to FIG. 8 each illustrate only a left half in the width direction of a vehicle, similarly to FIG. 2 and FIG. 3.

As illustrated in FIG. 6, at the time of small overlap collision, a barrier 72 collides with an end on the width outside of the front bumper R/F 24. The end on the width outside of the front bumper R/F 24 is bent and deformed while being pressed rearward. At this time, the crash box 22 is collapsed and deformed. Collision load is absorbed by this bending deformation, and this collapsing deformation.

When entering of the barrier 72 into the vehicle proceeds, bending deformation of the front bumper R/F 24 proceeds, and the barrier 72 slips through the front bumper R/F. The extension 28A receives the barrier 72 that has slipped. A front wall of the extension 28A extends along an UP-LW plane, and the extension 28A receives the barrier 72 from the front. Consequently, the vehicle is decelerated.

When the entering of the barrier 72 into the vehicle proceeds further, the front cross 10C or the side rail 10A of the front suspension member 10 is bent and deformed with the extension 28A as a point of effort. With this bending deformation, the angle of the front wall of the extension 28A changes. More specifically, as illustrated in FIG. 7, as the front wall of the extension 28A moves to the outside in the width direction, the front wall is aligned in an obliquely rearward orientation so as to move toward the vehicle rear side.

At this time, the front wall of the extension 28A obliquely abuts on the barrier 72, so that lateral force F is generated in the vehicle. That is, the vehicle proceeds obliquely forward with respect to the barrier 72.

In the process of the vehicle proceeding obliquely forward, the barrier 72 slips through the extension 28A to collide with the front wheel 30A, as illustrated in FIG. 8. At this time, load that acts rearward and outward (toe-out) is input to the front wheel 30A.

Figure 9:
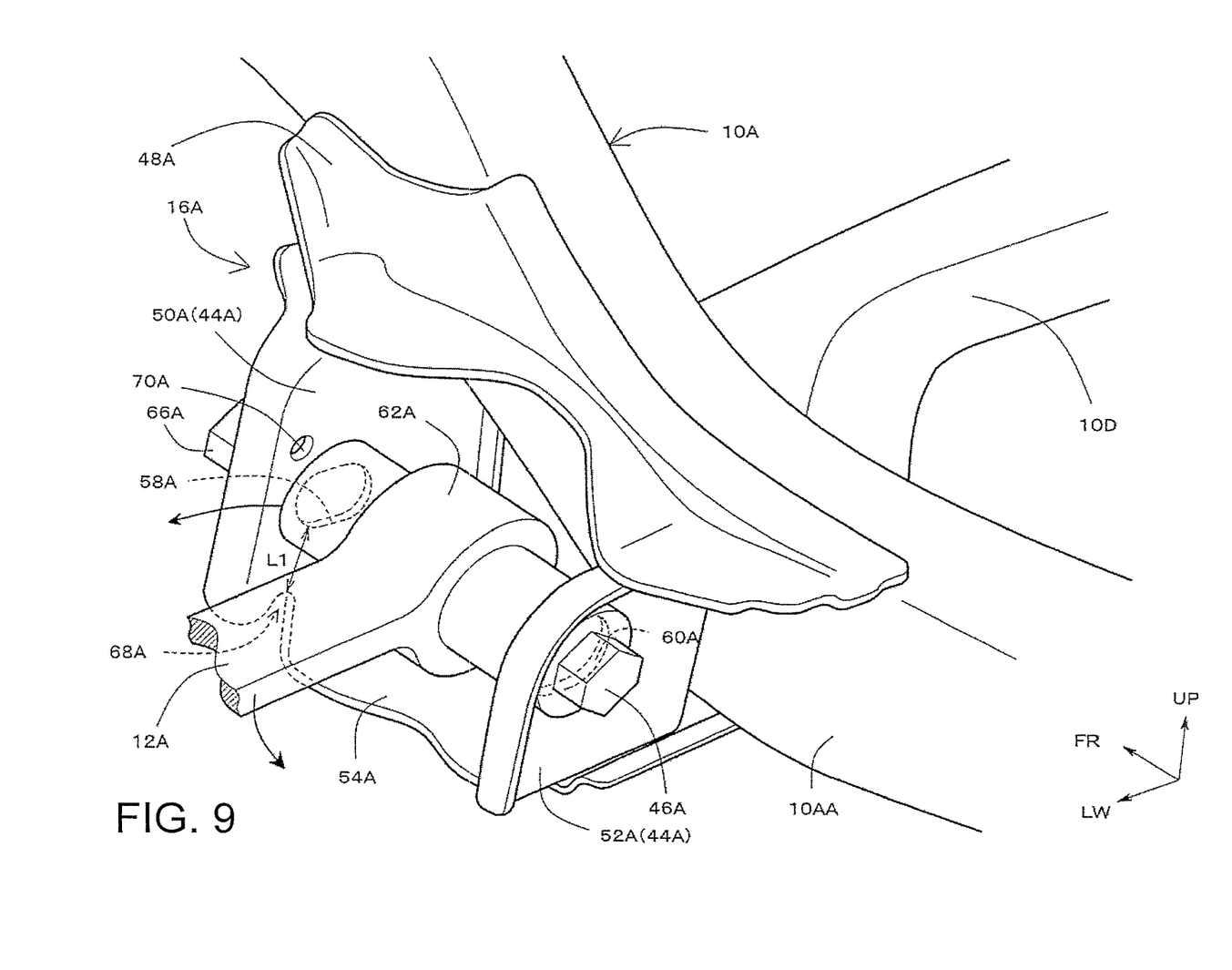
FIG. 9 is a perspective view for explaining load input around the first bracket at the time of the small overlap collision.

When this load is input, the first lower arm 12A tries to pivot toward the vehicle rear side with the first lower arm supporting mechanism 16A as a fulcrum. At this time, as illustrated in FIG. 9, load is generated in the first lower arm supporting mechanism 16A, outward in the vehicle width direction, with a supporting point of the support bolt 46A (supporting shaft member) by the rear wall part 52A of the first bracket 44A as a fulcrum, with the rod joint 62A of the first lower arm 12A as a point of effort, and with a supporting point of the support bolt 46A by the front wall part 50A of the first bracket 44A as a point of load.

With this load, the shaft part of the support bolt 46A presses an outside portion in the vehicle width direction of the front wall part 50A of the first bracket 44A with respect to a center position of the insertion hole 58A. With this pressing, the section that constitutes the shortest distance L1 between the insertion hole 58A and the edge of the front wall part 50A, and that connects the cutout 68A and the insertion hole 58A, that is, the fracture starting point, is fractured prior to other portions.

Figure 10:
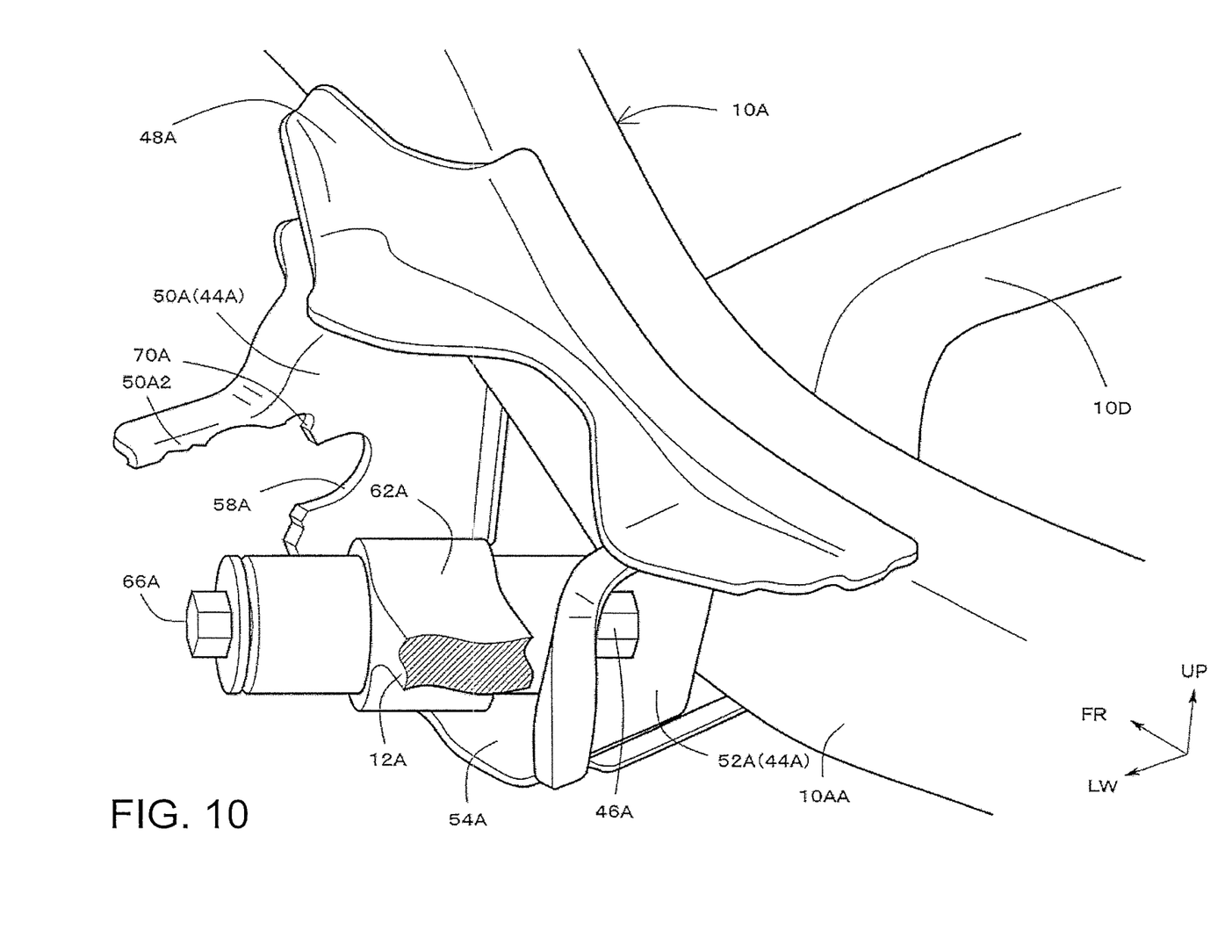
FIG. 10 is a perspective view for explaining fracture of the first bracket at the time of the small overlap collision.

This fracture is connected from the cutout 68A to the through hole 70A through the insertion hole 58A, and a major portion of the projecting part 50A2 of the front wall part 50A is pressed upward, as illustrated in FIG. 10. A portion from the cutout 68A of a lower end of the front wall part 50A to the through hole 70A above the insertion hole 58A is fractured, so that the insertion hole 58A is completely broken open outward in the vehicle width direction, and the shaft part of the support bolt 46A is swept out from the insertion hole 58A.

Figure 11:
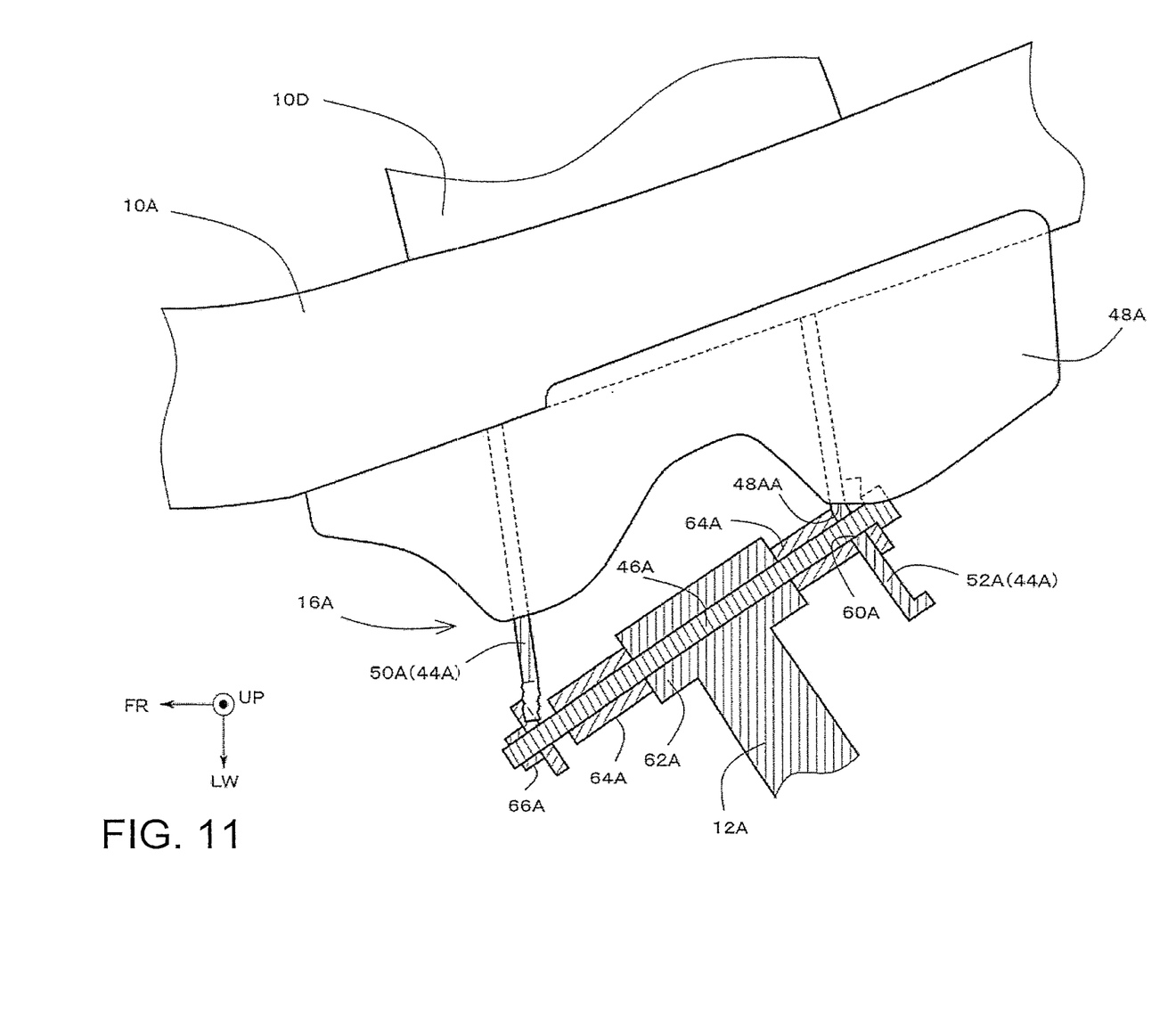
FIG. 11 is a plan view for explaining fracture of the first bracket at the time of the small overlap collision.

At the time of this sweeping out, the periphery of the insertion hole 60A of the rear wall part 52A is bent and deformed so as to be broken open toward the vehicle rear side, as illustrated in FIG. 10 and FIG. 11. As illustrated above, reinforcement by the reinforcing patch 48A (reinforcing member) is terminated on the inside in the vehicle width direction of the rear wall part 52A with respect to the insertion hole 60A, and therefore the outside portion in the vehicle width direction of the rear wall part 52A with respect to the insertion hole 60A is relatively easily bent. With such a configuration, the outside portion in the vehicle width direction is bent and deformed toward the vehicle rear side along the rotation of the support bolt 46A, as illustrated in FIG. 10. More specifically, as illustrated in FIG. 11, the rear wall part 52A is bent and deformed toward the vehicle rear side with a portion where the reinforcement of the rear wall part 52A by the reinforcing patch 48A is terminated, in other words, an end 48AA in the vehicle width direction of the reinforcing patch 48A, as a starting point.

The shaft part of the support bolt 46A is swept out from the fractured insertion hole 58A, so that the support of the support bolt 46A by the first bracket 44A is changed from two-point support by the front wall part 50A and the rear wall part 52A to one-point support by only the rear wall part 52A. Consequently, support load of the support bolt 46A to the rear wall part 52A increases rapidly. As a result, the rear wall part 52A is also fractured. As a result, the support bolt 46A is separated from the first bracket 44A. With the separation of the support bolt 46A from the first bracket 44A, the first lower arm 12A is separated from the first lower arm supporting mechanism 16A.

Furthermore, when the whole of the front suspension mechanism is confirmed, members that support the front wheel 30A are the second lower arm 14A and the upper arms with the separation of the first lower arm 12A from the first lower arm supporting mechanism 16A, and support load to these arm members increases rapidly. As a result, a supporting mechanism of the second lower arm 14A and the upper arms is also fractured, and these arm members are separated. As a result, all the arm members that connect the vehicle body and the front wheel 30A are separated from the vehicle body, and the front wheel 30A is separated from the vehicle body.

<Another Example of First Bracket According to the Embodiment>

Figure 12:
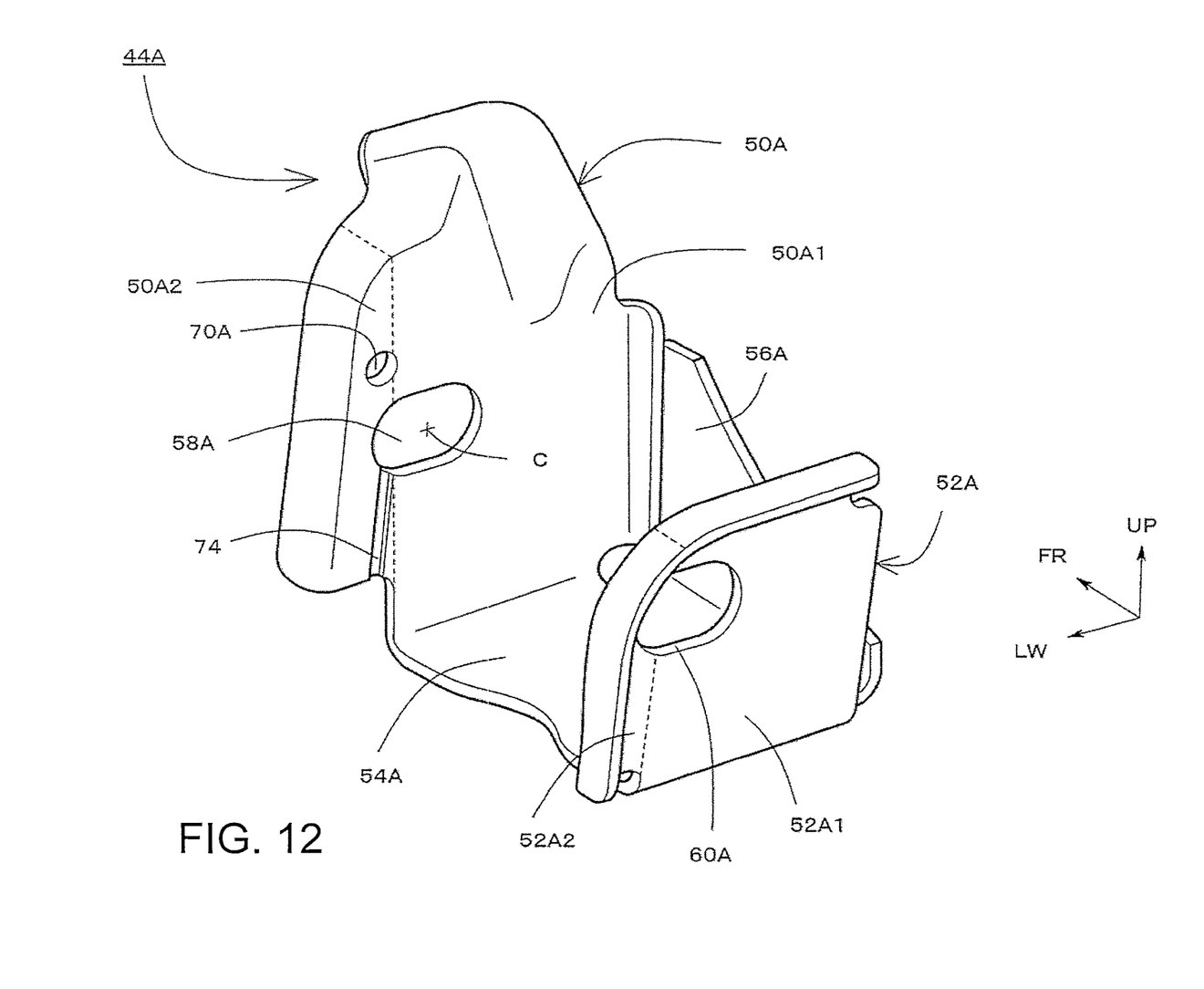
FIG. 12 is a perspective view illustrating another example of the first bracket.

While the cutout 68A is included in the fracture starting point of the first bracket 44A in FIG. 5, the embodiment is not intended to be a limitation. For example, as illustrated in FIG. 12, a thin part 74 extends from the center C of the insertion hole 58A to the lower end of the front wall part 50A on the outside in the vehicle width direction, and this may be a fracture starting point. In such a mode, at the time of small overlap collision, the thin part 74 is fractured prior to other parts. Consequently, the outside portion in the vehicle width direction of the front wall part 50A with respect to the insertion hole 58A is fractured. As a result, the insertion hole 58A can be broken open.

The present disclosure is not limited to the embodiments described above, and includes all changes and modifications without departing from the technical scope of the present disclosure prescribed by the scope of the claims and the nature.

The invention claimed is:

1. A lower arm supporting bracket fixed to a front suspension member, and supporting a lower arm of a front suspension mechanism, the lower arm supporting bracket comprising
   a front wall part and a rear wall part that face each other in a vehicle longitudinal direction, wherein
   respective insertion holes, through which a supporting shaft member pivotably supporting the lower arm is inserted, are formed in the front wall part and the rear wall part so as to face each other, and
   the front wall part includes a fracture starting point formed in a region on an outside, in a vehicle width direction, from a center position of the insertion hole of the front wall part, wherein
   the fracture starting point includes a cutout formed in a lower end of the front wall part on the outside, in the vehicle width direction, from the center position of the insertion hole of the front wall part, and
   a through hole is formed on the outside, in the vehicle width direction, of the front wall part from the center position of the insertion hole above the insertion hole.

2. A lower arm supporting mechanism comprising the lower arm supporting bracket according to claim 1, wherein
   a reinforcing member that projects outward in the vehicle width direction from the front suspension member, and is joined to an upper part of the rear wall part, is provided in the upper part of the rear wall part of the lower arm supporting bracket, and
   projection of the reinforcing member to the upper part of the rear wall part is terminated on an inside, in the vehicle width direction, with respect to the insertion hole of the rear wall part in plan view.

* * * * *